Oct. 25, 1927. 1,647,028
W. M. WHITNEY
WOOD SHAPING MACHINE
Filed Aug. 19, 1926 4 Sheets-Sheet 1
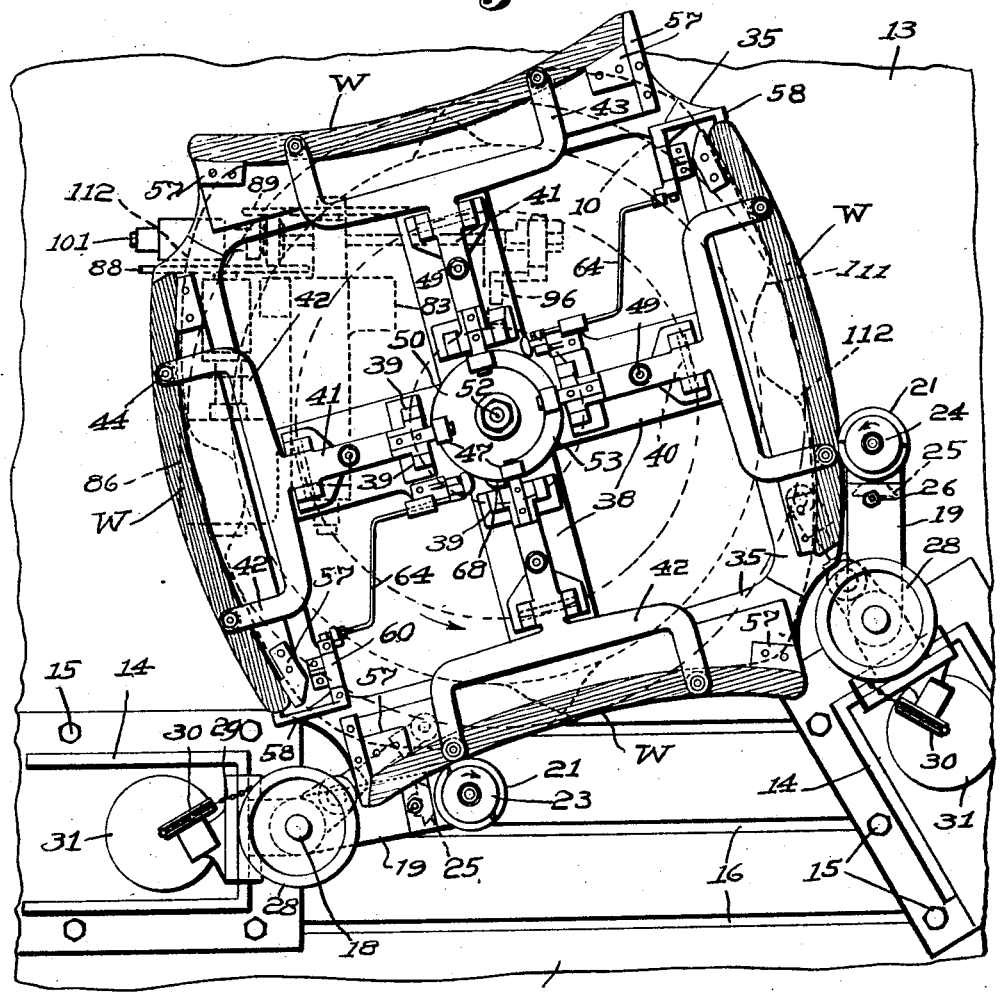

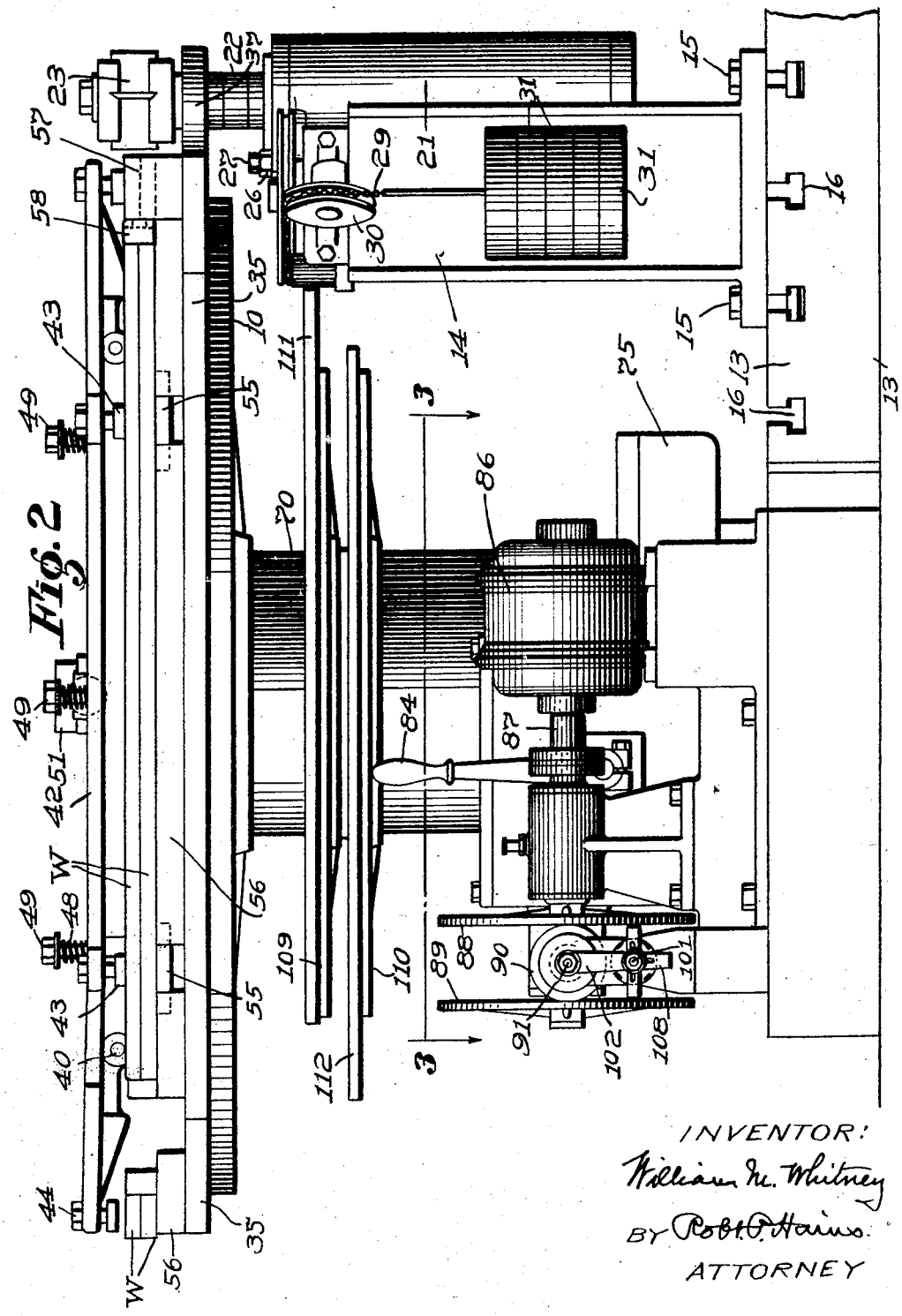

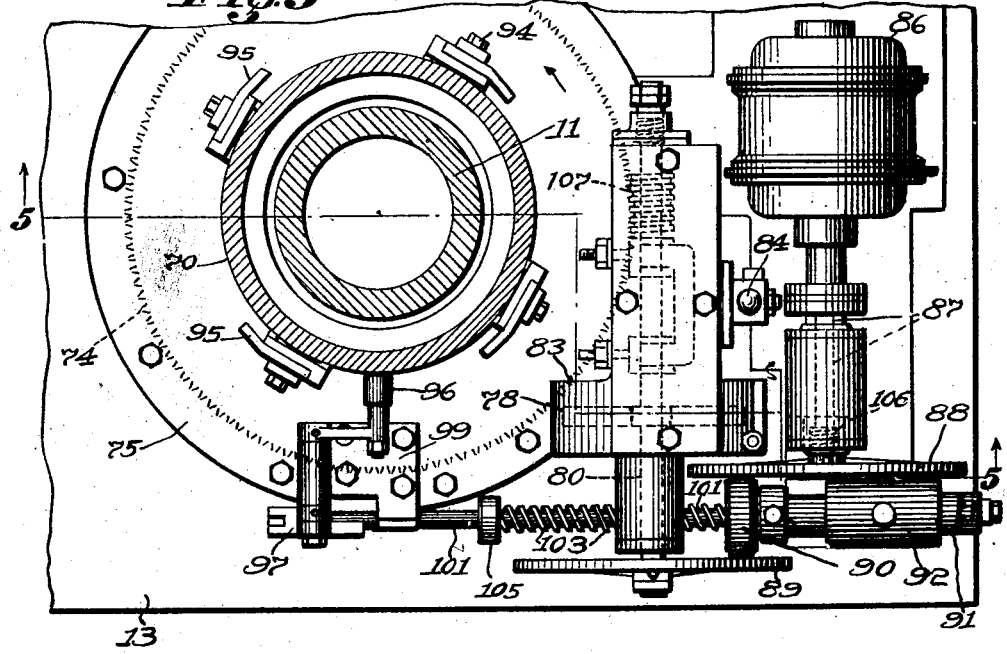
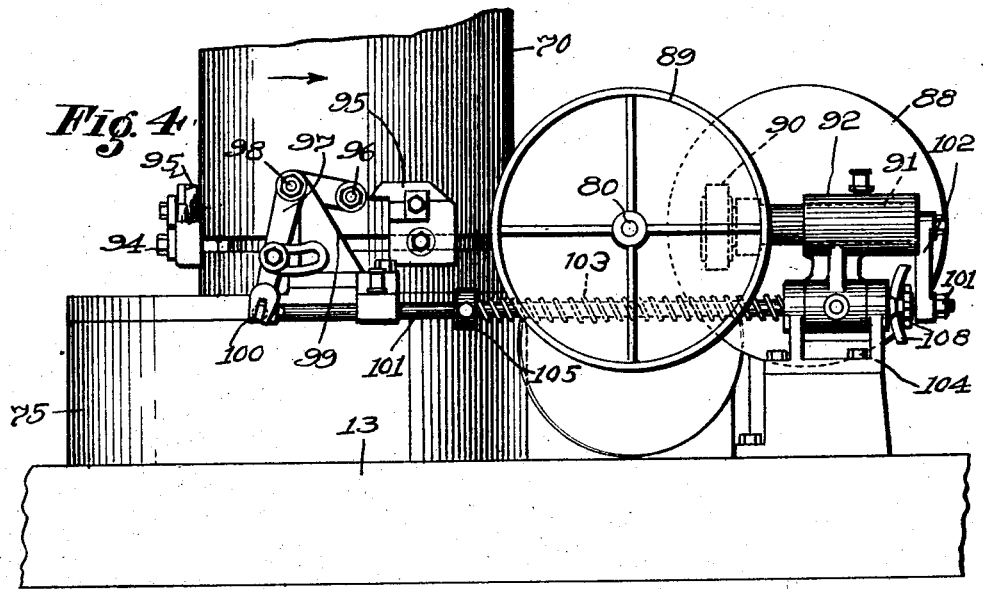

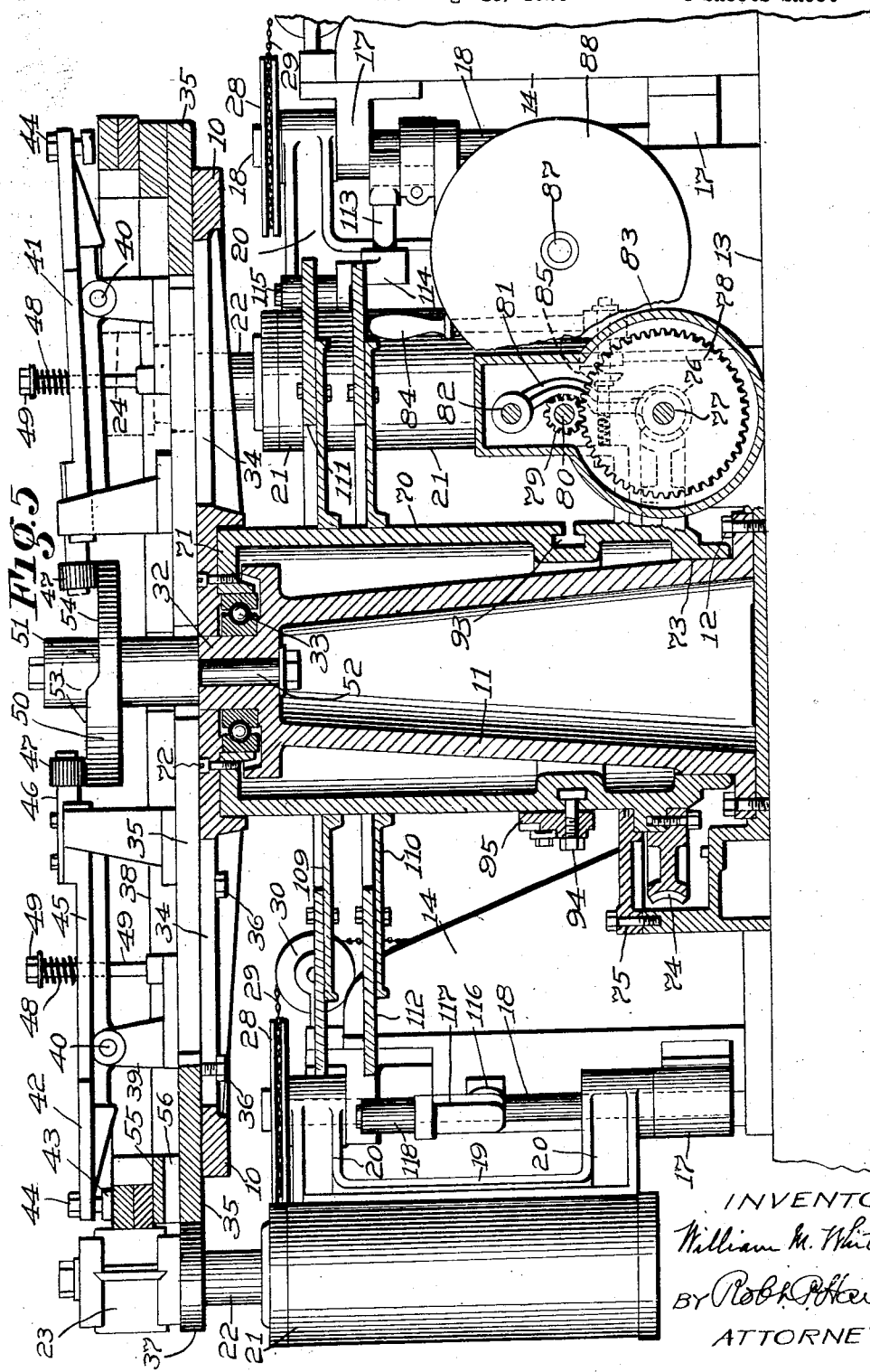

Patented Oct. 25, 1927.

1,647,028

UNITED STATES PATENT OFFICE.

WILLIAM M. WHITNEY, OF WINCHENDON, MASSACHUSETTS.

WOOD-SHAPING MACHINE.

Application filed August 19, 1926. Serial No. 130,161.

This invention relates to wood working machines and more particularly to machines for shaping wooden blanks in conformity with a profile guide.

In machines of this general type it is now the ordinary practice to subject work to the action of a cutter which rotates at high speed, but since the cutter should act upon the work in the direction of the grain of the wood and not against the grain, it has been customary heretofore to advance the work relatively to the cutter until a point is reached where the direction of the grain changes. The work is then moved from its operative relation with this cutter and is presented independently to another cutter rotating in the opposite direction to work in the direction of the grain in completing the shaping of the surface.

The present invention differs from such prior machines and has for its object the provision of a wood shaping machine which will complete the shaping of the work by a single passage of the work past two cutters that rotate in opposite directions, the construction being such that one cutter acts on a part of the surface to be shaped, and the other cutter acts upon another part of said surface to complete the shaping of said surface.

In accordance with the present invention, the work is mounted upon the work carrier and means are provided for presenting the work to the action of either of at least two cutters which are automatically controlled in their action upon the work so that one cutter will act upon one portion of the surface to be shaped and another cutter will act upon a different portion of said surface.

An important feature of the invention resides in a work carrier and means for constantly moving the carrier past two cutters which are controlled as to their action upon the work automatically in accordance with the direction of the grain of the work.

Inasmuch as the surface of the work to be shaped is acted upon by first one cutter and then another the operating parts should be so constructed that relative movement between the work and each of the cutters may be effected to bring each cutter into and out of engagement with the work, and in the embodiment of the invention illustrated each of the cutters is mounted for movement toward and from the work, while the work is fed relatively to the cutters by rotating the support upon which the work is mounted.

Another important feature of the invention therefore resides in means for moving the cutters toward and from the work in accordance with the requirements of the grain of the wood, and this is accomplished in the construction illustrated by cams mounted to rotate with the work support and which are shaped to hold the cutters in an inoperative position until the portion of the work to be acted upon by a particular cutter has been rotated to the proper position.

It frequently occurs that the work should be fed at a relatively slow feed while the cutter is acting upon a particular portion thereof, but a faster feed may be used while the cutter is operating upon other portions of the surface being shaped.

Another feature of the invention therefore resides in means for automatically varying the feed of the work as a predetermined portion of the work is presented to a cutter. This is accomplished in the construction shown by cams which serve to shift a variable speed drive for the work support.

It is important that the work blanks be accurately positioned upon the work support, and positioning stops may be provided to properly locate the work, but a particular positioning stop may engage a portion of the work which is to be acted upon by a cutter. Another feature of the present invention therefore resides in a work positioning stop which is provided with means for automatically moving the stop out of engagement with the work to thereby clear a cutter.

Other features of the invention and novel combination of parts, in addition to the above, will be hereinafter described in connection with the accompanying drawings, which illustrate one good practical form of the invention.

In the drawings:—

Fig. 1 is a plan view of a work shaping machine constructed in accordance with the present invention;

Fig. 2 is a side elevation of the machine of Fig. 1;

Fig. 3 is a sectional view taken on the line 3—3 of Fig. 2;

Fig. 4 is a side elevation of variable speed driving mechanism to be described;

Fig. 5 is a vertical sectional view taken on the line 5—5 of Fig. 3;

Fig. 6 is a side elevation of mechanism for shifting a work positioning stop;

Fig. 7 is a perspective view of parts shown in Fig. 6; and

Fig. 8 is a perspective view of one of the cutter supporting brackets having associated therewith a modified construction for moving the cutter to an inoperative position.

In the embodiment of the invention illustrated the work supporting carriage or table 10 is rotatably mounted upon the upper portion of a post 11 the lower end of which post is secured by bolts 12 to a bed plate or base plate 13.

The machine illustrated is provided with a pair of work engaging cutters which are mounted for swinging movement toward and from the work support. Each of these cutters, in the construction shown, is supported by an upright 14 the lower end of which is secured to the base plate 13 by bolts 15, and since it may be desirable to change the position of these posts with respect to the base plate to thereby vary the position of the cutters with respect to the table 10, the base plate 13 is shown as having the T-slots 16 adapted to adjustably receive the heads of the bolts 15. Each of the uprights 14 is provided with the laterally extending bearing lugs 17 in which the shaft 18 is journaled. To each of the shafts 18 is rigidly secured a cutter supporting bracket 19 having the spaced arms 20, the arrangement being such that the bracket 19 is supported by the pivot shaft 18 for swinging movement to move a cutter towards and from the work.

Each of the brackets 19 serves to support a casing 21 in which the cutter driving shaft 22 is journaled. The casing 21 may have mounted therein an electric motor or other means for driving the cutter shaft 22 at high speed. One of the cutter shafts 22 is rotated in a clockwise direction and is provided with a cutter 23, while the other cutter shaft 22 is rotated in a contraclockwise direction and is provided with a cutter 24.

It may be desirable to raise or lower the operating cutters relatively to the work, and each casing 21 is therefore preferably provided with a dove-tailed portion 25 which is slidably secured to the supporting bracket 19 as shown in Fig. 1. The casing 21 may be raised or lowered with respect to its supporting bracket by rotating the threaded shaft 26, the upper end of which may be provided with a wrench receiving head 27.

It is desirable to provide means for yieldingly urging each cutter toward the work support 10, and this is accomplished in the construction shown by securing a grooved wheel 28 rigidly to the upper end of each pivot shaft 18. The groove of the wheel 28 is adapted to receive a chain 29 one end of which is secured to the wheel 28, and an intermediate portion of the chain 29 extends about a grooved wheel 30 which is rotatably supported at the upper end of the upright 14, and a weight 31 is secured to the downwardly extending portion of the chain 29. The arrangement is such that the weight 31 will exert a continuous pull upon the chain 29 and this will tend to rotate the pivot shaft 18 in a direction to force its cutter towards the work.

The work supporting frame or carriage 10 may be circular in shape as shown, and is provided with a central opening adapted to receive the centreing boss 32 provided at the upper end of the post 11. The table 10 is preferably provided with an anti-friction bearing 33 for reducing the friction between the rotating table and the centreing post 32. The work supporting table 10 has a number of bolt receiving slots 34 in order that the parts carried by this table may be secured thereto in different positions of adjustment.

The work W to be acted upon by the cutters is secured to the work support 10 by clamping means to be described, and the engagement of the cutters 23 and 24 with the work is controlled by the profile guides 35 adjustably secured to the table 10 by bolts 36 passing through the slots 34. Upon each of the cutter shafts 22 is rotatably mounted a roller 37 adapted to rest against the outer edge of the profile gage 35 to thereby guide its cutter relatively to the work in conformity with the curvature of the profile gage.

In the present construction the work supporting table is provided with four different sets of work securing clamps so that the work may be secured to the work support at four different points about the central axis of the work support. Each clamp may serve to secure two or more pieces of work to the work support, and in the construction shown two pieces of work, one placed above the other, are held upon the work support by each clamp.

The work securing clamps are preferably so constructed that they are automatically moved to and from the work engaging position so that they will hold each piece of work in the clamped position as the work is being moved past the cutters, but will automatically release the work after it has been acted upon by both cutters in order that the finished work may be removed and new blanks inserted in its place.

This is accomplished in accordance with the present invention by securing to the table 10 the clamp supporting frame 38 having the four outwardly extending arms best shown in Fig. 1, and upon each of these arms is mounted in spaced relation a pair of upstanding brackets 39 adapted to have pivotally secured between them by the pivot pin 40 the work holding clamp 41. Each of the clamps 41 is provided with the spaced outwardly extending arms 42 having the work-engaging jaws 43. These jaws may be secured to the arms 42 in different positions of adjustment by the threaded bolts 44. Each of the clamping arms 41 has an inwardly extending portion 45 provided with an adjustable extension 46 to which is rotatably secured a roller 47. The work engaging clamps 41 are normally held in the open position by springs 48 which are mounted upon the bolts 49 extending upwardly from the clamp supporting casing 38 through clearance holes in the arms 45, and these springs 48 are confined between the upper face of the arms 45 and a nut or head provided at the upper end of each bolt 49.

As above stated, means is provided for automatically moving the clamping jaws to and from the work engaging position and in the construction shown this is accomplished by providing a cam wheel 50 having an integral hub 51 which is rigidly secured to the upper end of the fixed post 11 by a clamping bolt 52. The cam wheel 50, it should be noted, has a raised rib 53 which is substantially semi-circular in shape and the construction is such that rotation of the table 10 relatively to the fixed cam wheel 50 causes each roller 47 to rest upon the flat portion 54 of the cam wheel throughout part of a complete rotation of the table 10 and to engage the raised rib 53 during the rotation of the cable 10 through the remaining portion of a complete revolution. The result of this construction is such that as long as a roller 47 rests upon a rib 53 the work securing clamp is held in clamping engagement with the work, as clearly shown at the left-hand side of the machine of Fig. 5. When a roller 47 moves out of engagement with a rib 53 and rests upon the flat portion of the cam 54, its clamp will be moved to the work releasing position by the compressed spring 48, as will be apparent from the clamp shown at the right-hand side of the machine of Fig. 5. When the work W is clamped upon the work support the work is held between the movable jaws 43 above mentioned and the fixed jaws 55 which are mounted upon the jaw supporting elements 56, and the upper face of each jaw 55 is raised somewhat with respect to the supporting element 56 to insure engagement of the work with the jaws 55.

The blanks to be acted upon by the cutters should be accurately positioned between the clamping jaws, and to this end the work support may be provided with the stops 57. in some cases, however, it may be desirable to position a stop so that it will be engaged by the portion of the work which is to be acted upon by a cutter. In this case such stop will be injured by a cutter unless removed from its normal position when the cutter is acting upon such surface. One of the features of the present invention therefore resides in means for automatically moving a stop out of its normal position from the path of the cutter. This is accomplished, in the construction shown, by providing the work supporting carriage with the swinging stops 58 each of which is rigidly secured to a pivot shaft 59 that is rotatably mounted in a supporting bracket 60 secured to a profile gage 35 or other portion of the work support. Rocking movement is imparted to the swinging stop 58 by an arm 61 rigidly secured to the pivot shaft 59 and the stop 58 is normally held in its operative position by a coiled spring 62 which acts upon the stop through the sliding bolt 63. In order to rock the stop 58 from its full line position to its dotted line position of Fig. 6, so as to cause the stop to clear a cutter, a connecting rod 64 is provided one end of which is secured to the downwardly extending arm 61 and the other end of this rod is connected to a rocking arm 65 the upper end of which is pivotally secured to a supporting bracket 66, and an intermediate portion of the connecting rod 64 slides in a guiding block 67. Movement of the stop 58 to the position in which it is shown in dotted lines in Fig. 6 is effected by providing one or more fixed lugs 68 upon the outer curved face of the cam wheel 53, the arrangement being such that as the work supporting table 10 rotates a projection 69 upon the arm 65 will engage the fixed lug 68. This will impart a sliding movement to the connecting rod 64 which will serve to rock the stop 58 upwardly out of engagement with the work W, so that it will clear the cutter engaging this work.

As stated, the work supporting table 10 is rotated to feed the work against the cutters, and the means shown for imparting rotative movement to the table 10 consists of a hollow drum 70 which surrounds the fixed post 11 and the upper end of this drum is provided with a laterally extending flange portion 71 which is rigidly secured to the hub portion of the table 10 by bolts 72. The lower end portion of the drum 70 is preferably provided with a bearing surface 73 which rotates upon the lower portion of the hub 11, as will be apparent from Fig. 5. This lower bearing is desirable because it serves to steady the rotating table 10 and prevent vibration of the same.

Rotative movement is imparted to the table 10 by driving the drum 70 and to this end a worm gear 74 surrounds and is rigidly secured to the lower portion of the drum 70. This worm gear is preferably enclosed in a protecting casing 75. The gear 74 is driven by a worm 76 secured to the shaft 77 and this shaft is driven by the large gear 78, which gear is driven in turn by the pinion 79 that is rigidly secured to the shaft 80. It may be desirable to move the worm 76 out of engagement with the gear 74 in order that the table 10 may be rotated by hand in setting up the work. The shaft 77 is therefore supported by the swinging arms 81 which swing about the pivot pin 82, and the parts just described are mounted within the protecting casing 83. A hand operated lever 84 having the camming surface 85 is provided for moving the worm 76 into and out of driving engagement with the gear 74.

It is frequently desirable that the feeding of the work relatively to the cutter be temporarily slowed down as the cutter is brought into engagement with a particular portion of the work. Means is therefore provided, in accordance with the present invention, for automatically changing or slowing down the speed at which the table 10 is rotated. This is accomplished, in the present embodiment of the invention, by providing a motor 86 having a driving shaft 87 to which a friction disk 88 is secured, and the shaft 80 above mentioned is provided with a friction disk 89. Rotative movement is imparted from the disk 88 to the disk 89 by an intermediate friction disk 90 that is supported by a shaft 91 which shaft is mounted in the bearing bracket 92, the arrangement being such that the shaft 91 may be moved in the direction of its length to move the disk 90 relatively to the axes of the disks 88 and 89. As a result the speed at which the table 10 is rotated may be decreased by imparting sliding movement to the shaft 91, to move the disk 90 towards the shaft 87 and away from the shaft 80.

In order to automatically vary the speed of rotation of the table 10 as a predetermined portion of the work approaches a cutter, the drum 70 is provided with an annular groove 93 adapted to receive the heads of bolts 94 which are provided to clamp any desired number of camming elements 95 to the outer face of the drum 70. The camming elements 95 are so positioned that they engage a roller 96 carried by one arm of a bell crank lever 97 which lever is pivotally secured at 98 to a bracket 99 which may be fastened to the gear casing 75. A downwardly extending arm of the bell crank lever 97 is connected by means of a pin 100 to a sliding shaft 101, and the right-hand end of this shaft, viewing Fig. 4, is connected to the sliding shaft 91 by the arm 102. The construction just described is such that the parts are normally held in the position in which they are shown in Fig. 4 by the coiled spring 103 surrounding the shaft 101, and one end of which rests against the supporting bracket 104 for the sliding shaft, while the other end of the spring abuts against a collar 105 fastened to the shaft 101. When a cam 95 is forced against the roller 96 by rotation of the drum 70, the bell crank lever 97 will be rocked in a direction to slide the shaft 101 in a right-hand direction. This will shift the intermediate disk 90 to slow down the speed at which the table 10 is rotated. As soon as the cam 95 is moved out of engagement with the roller 96 the intermediate gear 90 will be returned to its normal position under the action of the spring 103.

The disk 88 is preferably yieldingly forced towards the intermediate disk 90 by a spring 106, and the disk 89 is preferably urged in the opposite direction by the spring 107. The bearing bracket 92 is preferably mounted for rocking movement to permit the disk 90 to frictionally engage both disks between which it is mounted. Adjustable lock nuts 108 are provided upon the sliding shaft 101 to control the longitudinal movement of this shaft.

As above pointed out one of the cutters is rotated in a right-hand direction and the other is rotated in a left-hand direction, and it is desirable to allow one cutter to act upon the work until the direction of the grain of the wood changes, and then move this cutter out of engagement with the work and cause the cutter which rotates in the opposite direction to complete the cutting action upon the surface of the work. This is accomplished by providing means for moving the cutters independently out of their work-engaging position, and in the construction shown this is accomplished by providing the rotating drum 70 with an upper cam supporting disk 109 and a lower cam supporting disk 110, which are secured to and are rotated by the drum 70. The upper disk 109 has adjustably secured thereto the desired number of cutter positioning cams 111, two cams 111 being shown in the present construction. The lower disk 110 is likewise provided with a pair of cutter positioning cams 112. The cams 111 serve to hold the cutter 24 out of engagement with the work and to this end the pivot shaft 18 which supports the cutter 24 for rocking movement towards and from its work is provided with a laterally extending arm 113, having a bracket 114 which carries a roller 115 adapted to rest against the outer face of the cam 111. The pivot shaft 18 which supports the cutter 23 is likewise provided with a laterally extending arm 116 having a bracket 117 provided with a roller 118 which roller acts upon the outer curved face of the cams 112.

As above pointed out the cutters 23 and 24 are normally urged towards the work by the weights 31 and as a result the roller 37 with which each cutter is provided rests against the profile guide 35 except when a particular cutter is held away from its work by the cams 111 or 112. The shape of the cams 111, 112 is such that one cutter will remain in engagement with its work until the direction of the grain of the wood changes, whereupon this cutter will be forced out of engagement with the work by one of the cams just mentioned, and the cutting operation upon this particular piece of work will be completed by the other cutter which is rotated in a different direction. As a result of this construction the action of the cutters 23 and 24 upon the work to give the same the desired configuration is controlled by the engagement of the rollers 37 with the profile gages 35, while the movement of the cutters toward and from the position in which they are controlled by the profile gages is regulated by the cams 111 and 112.

In Fig. 8 of the drawing a slight modification is shown in which the roller supporting arms 113 and 116 have been replaced by a differently shaped arm 119 which is secured to the cutter supporting bracket 19 adjacent the motor casing 21, and the arm 119 is provided with a roller 120 adapted to engage either the cams 111 or the cams 112.

What is claimed is:—

1. In a shaping machine, the combination of a work support mounted to feed the work toward the cutters, a pair of cutters both mounted for movement toward and from the work support and relatively to each other, guide means for controlling the engagement of the cutters with the work, to give the work the desired curvature, and independent means for automatically moving the cutters away from the work and said guide means to thereby control the engagement of the different cutters with different portions of the work.

2. In a shaping machine, the combination of a work support mounted to rotate about a central fixed axis to feed the work toward the cutters, a pair of cutters mounted for movement toward and from the work and relatively to each other, guide means for controlling the engagement of the cutters with the work to give the work the desired curvature, independent means for automatically moving the cutters relatively to the work and guide means to thereby control the engagement of the different cutters with different portions of the work.

3. In a shaping machine, the combination of a work support mounted to rotate about a central axis to feed the work toward the cutters, a pair of cutters mounted for movement toward and from the work and relatively to each other, profile guide means for controlling the engagement of the cutters with the work, and cam means rotatable with the work support to force the cutters out of engagement with the work and out of control of the profile guide means to thereby control the engagement of the different cutters with different portions of the work.

4. In a shaping machine, the combination of a work support mounted to rotate about a central axis to feed the work toward the cutters, a pair of cutters mounted for movement independently of each other toward and from the work, a profile guide adjacent the work for guiding the cutters with respect to the work, and cam means rotatable with the work and constructed to effect movement of the cutters to and from the position in which they are controlled by such profile guide to determine which one of the cutters shall act upon a particular portion of the work.

5. In a shaping machine, the combination of a work support mounted to rotate about a central axis to feed the work toward a cutter, a rotating cutter mounted for movement towards and from the work, a profile gage for controlling the engagement of the cutter with the work, and means operable from a going portion of the machine for changing the speed at which the work support is rotated as the work approaches a predetermined position.

6. In a shaping machine, the combination of a work support mounted to rotate about a central axis to feed the work towards a cutter, a rotating cutter, a profile gage, means engaging the profile gage to control the engagement of the cutter with the work, and means operable automatically to change the speed at which the support rotates to cause it to turn through part of a revolution at one speed and through another part of the revolution at a different sped.

7. In a shaping machine, the combination of a rotating cutter, a work support for feeding the work toward the cutter, means for supporting the cutter and work support so that one may be moved bodily toward the other, a profile guide for controlling said movement to control the engagement of the cutter with the work, and means operable by the movement of the work support to effect a momentary slowing down of the feed of the work and then restore the feed to its normal speed.

8. In a shaping machine, the combination of a work support mounted to rotate about a central axis to feed the work toward a cutter, a cutter, means for supporting the cutter and work support so that one may be moved bodily towards the other, profile means for controlling the engagement of the cutter with the work, and means operable by a going part of the machine to temporarily slow down the feed of the support as the support approaches a predetermined position.

9. In a shaping machine, the combination of a work support mounted to rotate about a central axis to feed the work toward a cutter, a cutter, profile means for controlling the engagement of the cutter with the work, and cam means rotatable with the support and operable to temporarily slow down the rotative movement of the support as the latter rotates through a predetermined angle.

10. In a shaping machine, the combination of a cutter, a work support mounted to rotate about a central axis to feed the work toward the cutter, and means for temporarily slowing down the rotative movement of the support as the latter rotates through a predetermined angle, including cooperating driving disks and means operable by a going part of the machine to shift one of the disks to thereby vary the feeding of said support.

11. In a shaping machine, the combination of a cutter, a work support mounted to rotate about a central axis to feed the work toward the cutter, and means for turning the support through part of a complete rotation at one speed and through another part of the complete rotation at a different speed, including a driver disk and a driven disk mounted to rotate about different axes, an intermediate disk cooperating with said driver and driven disks to drive one from the other, and power actuated means for shifting the intermediate disk to thereby vary the feeding movement of the work support.

12. In a shaping machine, the combination of a cutter, a work support mounted to rotate about a central axis to feed the work toward the cutter, a variable speed drive for rotating the work support, and including a train of moving elements one of which may be shifted relatively to the other to vary the feeding movement of the work, and a cam mounted to rotate with the support and positioned to shift said element to slow down the feed as the cutter engages a predetermined portion of the work.

13. In a shaping machine, the combination of a fixed supporting frame, a work supporting table rotatably mounted upon said frame and having a downwardly extending portion, a pair of cutters having driving shafts supported at points below the table for independent movement toward and from the work, guide means for controlling the engagement of the cutters with the work, and cutter positioning cams mounted below the table upon said downwardly extending portion and positioned to force the cutters away from the work to thereby determine which one of the cutters shall act upon a particular portion of the work.

14. In a shaping machine, the combination of a work support mounted to rotate about a central axis to feed the work toward the cutters, a pair of cutters mounted for movement independently of each other toward and from the work, means for yieldingly forcing the cutters towards the work, guide means for controlling the engagement of the cutters with the work, and cam means mounted to rotate with the work support and shaped to move the cutters away from the work and their guide means to thereby determine which cutter shall act upon a particular portion of the work.

15. In a shaping machine, the combination of a fixed central post, a work support rotatably mounted upon the post, a hollow drum surrounding said post and rigidly secured to said support, means for rotating the drum to rotate the support, a pair of cutters mounted for movement independently toward and from the work, and cam means secured to said drum and constructed to hold the cutters out of engagement with the work to thereby determine which cutter shall act upon a particular portion of the work.

16. In a shaping machine, the combination of a fixed central post, a work support rotatably mounted upon the post, a hollow drum surrounding said post below the support and rigidly secured to the support, means for rotating the drum to rotate the work support, means for varying the speed at which the work support is rotated, cutters supported to engage the work as the support is rotated, and cam means carried by said drum for actuating said variable speed means.

17. In a shaping machine, the combination of a fixed central post, a work supporting table rotatably mounted upon the post, a hollow drum extending downwardly from the table about said post and having a bearing at its lower end for steadying the rotating table, means for rotating the drum to rotate the table, and a rotating current supported for movement toward and from the table.

18. In a shaping machine, the combination of a fixed central post, a work support rotatably mounted upon the post, a hollow drum secured to said support and extending downwardly about the post, a pair of cutters each having a driving shaft supported at points below the work support for swinging movement toward and from the work, cutter positioning cams secured to said drum, and cam engaging elements extending from the supporting means for said shafts into engagement with the cams and adapted to swing the cutters away from the work to thereby control the engaging of the cutters with different portions of the work.

19. In a shaping machine, the combination of a work support mounted to rotate about a central axis to feed the work toward the cutters, a pair of cutters mounted for movement independently of each other toward and from the work, a profile guide for controlling the action of the cutters upon the work to give the desired configuration to the work, and cam means rotatable with the work and constructed to effect the movement of the cutters into and out of the position in which they are under the control of the profile gage.

20. In a shaping machine, the combination of a work support mounted to rotate about a central axis to feed the work toward the cutters, a pair of cutters mounted for movement independently of each other toward and from the work, a profile guide for controlling the action of the cutters upon the work to give the desired configuration to the work, guide engaging means associated with each cutter, and cam means rotatable with the work and constructed to move the guide engaging means of each cutter out of engagement with the profile guide to thereby determine which one of the cutters shall act upon a particular portion of the work.

21. In a shaping machine, the combination of a work support mounted to rotate about a central axis to advance the work toward the cutters, a pair of cutters each mounted for movement independent of the other toward and from the work, a profile guide for controlling the action of the cutters upon the work, a cam rotatable with the work and constructed to effect the movement of one cutter into and out of the position in which it is under the control of the profile guide, and a second cam rotatable with the work and constructed to effect the movement of the other cutter into and out of the position in which it is under the control of the profile guide.

22. In a shaping machine, the combination of a cutter, a work supporting table mounted to rotate about a fixed support to feed the work past the cutter, a work positioning stop mounted upon said table for movement into and out of position to engage a portion of the work that is to be acted upon by said cutter, and means for automatically moving the stop out of its work-engaging position so that it will clear said cutter, including an actuating element upon said fixed support, and a movable element upon the table and positioned to be forced by the rotation of the table against said fixed element to shift the stop.

23. In a shaping machine, the combination of a cutter, a work supporting table mounted to rotate about a fixed support to feed the work past the cutter, work positioning stops each mounted upon said table for movement into and out of position to engage portions of the work that is to be acted upon by said cutter, and means for automatically moving the stops one after the other out of their work engaging position to clear the cutter, including an actuating element secured to the fixed support, movable elements carried by the table and operatively connected to the stops, and each movable element being positioned to be forced by the rotation of the table against said fixed element to successively shift the stops.

24. In a shaping machine, the combination of a cutter, a work supporting table mounted to rotate about a central support to feed the work past the cutter, a work positioning stop mounted upon said table for movement into and out of position to engage portion of the work that is to be acted upon by said cutter, means for rotating the table through a complete revolution, and means for automatically moving the stop out of the work engaging position to clear the cutter, including an actuating element secured to a fixed support and a movable element upon said table and operatively connected to said stop and positioned to be shifted by said actuating element as it is carried past the same by the rotation of the table.

In testimony whereof, I have signed my name to this specification.

WILLIAM M. WHITNEY.